US011352488B2

(12) United States Patent
Niessner et al.

(10) Patent No.: US 11,352,488 B2
(45) Date of Patent: *Jun. 7, 2022

(54) ULTRA-HIGH FLOW STYRENE ACRYLONITRILE COPOLYMER COMPOSITIONS

(71) Applicant: INEOS STYROLUTION GROUP GMBH, Frankfurt am Main (DE)

(72) Inventors: Norbert Niessner, Friedelsheim (DE); Gisbert Michels, Leverkusen (DE); Thomas W. Cochran, Channahon, IL (US); Shridhar Madhav, Vadodara (IN); Kirit Gevaria, Vadodara (IN); Mukesh Modi, Vadodara (IN)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/046,437

(22) PCT Filed: Apr. 12, 2019

(86) PCT No.: PCT/EP2019/059452
§ 371 (c)(1),
(2) Date: Oct. 9, 2020

(87) PCT Pub. No.: WO2019/201782
PCT Pub. Date: Oct. 24, 2019

(65) Prior Publication Data
US 2021/0108061 A1    Apr. 15, 2021

(30) Foreign Application Priority Data
Apr. 16, 2018 (EP) ..................... 18167438

(51) Int. Cl.
*C08L 25/12* (2006.01)
*C08L 53/02* (2006.01)

(52) U.S. Cl.
CPC ............. *C08L 25/12* (2013.01); *C08L 53/025* (2013.01)

(58) Field of Classification Search
CPC ................ C08L 53/025; C08L 25/12
See application file for complete search history.

(56) References Cited

U.S. PATENT DOCUMENTS

| | | |
|---|---|---|
| 4,009,226 A | 2/1977 | Ott et al. |
| 4,091,053 A | 5/1978 | Kitchen |
| 4,181,788 A | 1/1980 | Wingler et al. |
| 4,584,346 A | 4/1986 | Kitchen |
| 4,704,434 A | 11/1987 | Kitchen et al. |
| 4,704,435 A | 11/1987 | Kitchen |
| 5,013,790 A | 5/1991 | Tung et al. |
| 5,227,419 A | 7/1993 | Moczygemba et al. |
| 5,399,628 A | 3/1995 | Moczygemba et al. |
| 5,760,134 A * | 6/1998 | Guntherberg .......... C08L 51/003 525/71 |
| 6,096,828 A | 8/2000 | Deporter et al. |
| 2004/0169449 A1* | 9/2004 | Kim ...................... D06F 39/12 312/228 |
| 2010/0168315 A1 | 7/2010 | Park et al. |
| 2015/0017366 A1* | 1/2015 | Tranninger ........... C08F 210/06 428/36.92 |
| 2017/0058117 A1* | 3/2017 | Sato ........................ C08L 53/02 |

FOREIGN PATENT DOCUMENTS

| | | |
|---|---|---|
| CN | 102108164 A | 6/2011 |
| CN | 102786767 A | 11/2012 |
| CN | 103044846 A | 4/2013 |
| CN | 103923429 A | 7/2014 |
| DE | 2420358 A1 | 12/1975 |
| DE | 2724360 A1 | 12/1978 |
| JP | 2010222462 A | 10/2010 |
| WO | 0134699 A1 | 5/2001 |
| WO | 02066556 A1 | 8/2002 |
| WO | 2012022710 A1 | 2/2012 |

* cited by examiner

*Primary Examiner* — Jeffrey C Mullis
(74) *Attorney, Agent, or Firm* — J.A. Lindeman & Co. PLLC

(57) ABSTRACT

Thermoplastic molding composition comprising (A) 40 to 80 wt.-% SAN copolymer (S/AN-ratio 78:22 to 65:35, Mw 80,000 to 250,000 g/mol); (B) 20 to 60 wt.-% SBC block copolymer (monovinylarene 61 to 64 wt.-%) comprising conjugated diene/monovinylarene tapered polymer blocks; and (C) 0 to 5 wt.-% additives and/or processing aids (C); exhibiting ultra-high melt flow with good mechanical, thermal and optical properties, a process for its preparation and its use for the production of bulky and/or thin walled articles.

13 Claims, No Drawings

ULTRA-HIGH FLOW STYRENE ACRYLONITRILE COPOLYMER COMPOSITIONS

The invention is directed to thermoplastic molding compositions based on SAN copolymers that exhibit an ultra-high flow with good mechanical, thermal and appreciable optical properties, a process for their preparation and their use.

Thermoplastic molding compositions based on styrenic copolymers such as styreneacrylonitrile (SAN) copolymers or acrylonitrile-butadiene-styrene (ABS) polymer compounds—composed of SAN copolymers and ABS graft copolymers—are widely used for different applications. ABS polymer compounds are used in automotive industries due to their unique features like dimensional stability, impact strength and ease of processing. In addition to this, ease of painting/electroplating and good aesthetic appearance makes them choice for electronics and household applications. ABS polymer compounds can be used in a wide range of applications in the automotive, household, healthcare etc. segments.

SAN copolymers are used for many house hold items where appreciable transparency is needed. However, when the article to be molded is bulky and/or has a thin walled intricate design, it is difficult to mold materials comprising conventional SAN or ABS polymer compositions, which have a lower melt flow index (MFI) than required to suit to this specific application. Further, there will be internal stress developed in the material making it weaker.

The melt flow index (MFI) is a measure of the mass of polymer that is extruded through a capillary die at a certain temperature and force. Melt Flow Index is an assessment of average molecular mass and is an inverse measure of the melt viscosity. In other words, the higher the MFI, the more polymer flows under test conditions. As per conventional practice the MFI of the polymer can be improved by use of low molecular weight polymers, wax based additives, lubricants and flow modifiers etc.

Conventional high flow ABS resin compositions (e.g. CN 102108164 A) often rely on SAN matrices having low molecular weights (4.000 to 8.000 g/mol) and a low acrylonitrile (AN) content (25.5 wt.-% or less). This will result in inferior chemical resistance, weatherability and mechanical properties due to a compromise of the acrylonitrile (AN) content and the molecular weight of the SAN matrix. Apparently, the residuals in the polymer grades may increase substantially due to process limitations.

U.S. Pat. No. 8,8389,628 discloses high flow (MFI 32 to 67 g/10 min at 250° C./10 kg load) thermoplastic compositions comprising (A) a SAN resin with epoxy or hydroxyl groups, (B) an ABS resin composed of 5 to 40 wt.-% ABS-graft copolymer (B1) and 60 to 95 wt.-% SAN-copolymer (B2, AN-content 30 to 5 wt.-%) and a polyester (C). Preferred are ABS resins (B) having an AN content of 20 wt.-% or less.

Other prior art high flow ABS resin compositions (e.g. CN 102786767 A, CN 10 3923429 A) comprise beside ABS graft copolymers and SAN copolymers flow improving additives (e.g. lubricants).

Said conventional flow enhancer additives consisting of low molecular weight polymer or wax often compromise with the mechanical and thermal properties of the styrenic copolymer composition. Alternatively, the high flow of styrenic resin compositions is accomplished by use of halogenated flame retardant additives (e.g. CN 103044846 A). The use of these additives is limited due to the deterioration of the mechanical performance and thermal stability of the composition. In addition, there are limitations on use of halogenated additives.

U.S. Pat. No. 6,096,828 discloses tough/rigid, transparent polymer blends comprising styrenic polymers such as polystyrene (all examples), ABS copolymers and SAN-copolymers (not further specified, no example) and a coupled styrene/butadiene block copolymer having a vinyl aromatic content of preferably 65 to 90 wt.-% (all examples 75 wt.-%) and comprising at least three consecutive styrene/butadiene tapered blocks. U.S. Pat. No. 6,096,828 is silent about the melt flow properties of said blends.

Said blends of the prior art often are not suitable for applications where dimensional stability, chemical resistance and high stiffness is required along with high flow to favor molding of thin walled bulky articles. Thus, there is still a need of improvement of styrenic polymer compositions for this particular purpose.

SAN copolymer resin compositions with a high flow are desirable for pen manufactures and many household items where appreciable transparency is needed.

It is an objective of the instant invention to provide thermoplastic molding compositions based on SAN copolymers with a high melt flow (MFI) without compromising the mechanical, thermal and certain optical properties of the composition.

One aspect of the invention is a thermoplastic molding composition comprising (or consisting of) components A, B and C:

(A) 40 to 80 wt.-% of at least one copolymer (A) of styrene and acrylonitrile in a weight ratio of from 78:22 to 65:35, preferably 75:25 to 70:30, more preferably 74:26 to 72:28, it being possible for styrene and/or acrylonitrile to be partially (less than 50 wt.-%) replaced by methyl methacrylate, maleic anhydride, N-phenylmaleimide and/or 4-phenylstyrene; wherein copolymer (A) has a weight average molar mass $M_w$ of 80,000 to 250,000 g/mol;

(B) 20 to 60 wt.-% of at least one coupled conjugated diene/monovinylarene block copolymer (B) comprising one or more conjugated diene/monovinylarene tapered polymer blocks, where—in the final block copolymer—all conjugated diene is incorporated into the tapered polymer block, and—based on the total weight of the final block copolymer—the monovinylarene is present in an amount of 61 to 64 wt.-%, and the conjugated diene is present in an amount of 36 to 39 wt.-%; and (C) 0 to 5 wt.-% additives and/or processing aids (C); where the components A, B, and, if present C, sum to 100 wt.-%.

Wt.-% means percent by weight.

If component (C) is present, its minimum amount is 0.01 wt.-%, based on the entire thermoplastic molding composition molding compound. Preferred are thermoplastic molding compositions according to the invention wherein component (d) is present in an amount of 0.01 to 5 wt.-%, preferably in an amount of 0.1 to 5 wt.-%, more preferably 0.5 to 3 wt.-%.

The term "diene" means a conjugated diene; "butadiene" means 1,3-butadiene.

A diene/monovinylarene polymer block is "tapered" when both (a) the mole fraction of conjugated diene units in a first section of the block is higher than the mole fraction of conjugated diene units in a second section of the block, wherein the second section of the block is closer to a given end of the block, and (b) condition (a) is true for substantially all sections of the block. Depending on the size of the sections being considered, condition (a) may not be true for all sections, but if so, will be not true at no more than about the level expected by chance.

The weight average molar mass $M_w$ is determined by GPC (solvent: tetrahydrofuran, polystyrene as polymer standard) with UV detection according to DIN 55672-1:2016-03.

Often thermoplastic molding compositions of the invention comprise (or consists of):
40 to 70.9 wt.-% component (A),
20 to 59.9 wt.-% component (B),
0.1 to 5 wt.-% component (C).

It is preferred that the thermoplastic molding composition comprises (or consists of):
55 to 70 wt.-% component (A),
30 to 45 wt.-% component (B),
0 to 5 wt.-% component (C).

Further preferred the thermoplastic molding composition of the invention comprises (or consists of):
55 to 69.9 wt.-% component (A),
30 to 44.9 wt.-% component (B),
0.1 to 5 wt.-% component (C).

It is preferable that the thermoplastic molding composition comprises (or consists of):
55 to 65 wt.-% component (A),
35 to 45 wt.-% component (B),
0 to 5 wt.-% component (C).

Most preferred the thermoplastic molding composition of the invention comprises (or consists of):
58 to 61.9 wt.-% component (A),
38 to 41.9 wt.-% component (B),
0.1 to 4 wt.-% component (C).

In addition to the components (A), (B) and (C), the inventive thermoplastic molding composition may contain further rubber-free thermoplastic resins (TP) not composed of vinyl monomers, such thermoplastic resins (TP) being used in amounts of up to 1 parts by weight, preferably up to 0.8 parts by weight and particularly preferably up to 0.6 parts by weight (in each case based on 100 parts by weight of the total of (A), (B) and (C)).

The thermoplastic resins (TP) as the rubber-free copolymer in the thermoplastic molding composition according to the invention which can be used in addition to the mentioned components (A), (B) and (C), include for example polycondensation products, for example aromatic polycarbonates, aromatic polyester carbonates, polyesters, polyamides.

Suitable thermoplastic polycarbonates, polyester carbonates, polyesters and polyamides are known and described on pages 14 to 18 of WO 2012/022710.

Preference is given to thermoplastic molding compositions not comprising a further component TP.

Preferably the melt flow index (MFI) (determined according to ISO 1133 at 220° C./10 kg load) of the thermoplastic molding compositions according to the invention is in the range of 100 to 140 g/10 min.

Component (A)

Copolymer (A) (=component (A)) is a copolymer of styrene and acrylonitrile in a weight ratio of from 78:22 to 65:33, preferably 75:25 to 70:30, more preferred 74:26 to 72:28, it being possible for styrene and/or acrylonitrile to be partially (less than 50 wt.-%, preferably less than 20 wt.-%, more preferably less than 10 wt.-%, based on the total amount of monomers used for the preparation of (A)) replaced by methyl methacrylate, maleic anhydride, N-phenylmaleimide and/or 4-phenylstyrene.

It is preferred that styrene and acrylonitrile are not partially replaced by one of the above-mentioned comonomers. Component (A) is preferably a copolymer of styrene and acrylonitrile.

The weight average molar mass $M_w$ of copolymer (A) generally is 80,000 to 250,000 g/mol, preferably 90,000 to 150,000 g/mol, more preferably 90,000 to 120,000 g/mol, most preferred 90,000 to 110,000 g/mol.

The Melt Flow Index (MFI) (ISO 1133 standard, 220° C./10 kg load) of copolymer (A) is preferably in the range from 60 to 80 g/10 min.

Preferably copolymer (A) is a copolymer of styrene and acrylonitrile in a weight ratio of from 74:26 to 72:28 having a weight average molar mass $M_w$ of 90,000 to 150,000 g/mol.

Details relating to the preparation of such copolymers are described, for example, in DE-A 2 420 358, DE-A 2 724 360 and in Kunststoff-Handbuch ([Plastics Handbook], Vieweg-Daumiller, volume V, (Polystyrol [Polystyrene]), Carl-Hanser-Verlag, Munich, 1969, pp. 122 ff., lines 12 ff.). Such copolymers prepared by mass (bulk) or solution polymerization in, for example, toluene or ethylbenzene, have proved to be particularly suitable.

Component (B)

Component (B) is at least one, preferably one, coupled conjugated diene/monovinylarene block copolymer (B) comprising one or more conjugated diene/monovinylarene tapered polymer blocks, where—in the final block copolymer—all conjugated diene is incorporated into the tapered blocks, and—based on the total weight of the final block copolymer—the monovinylarene is present in an amount of 61 to 64 wt.-%, and the conjugated diene is present in an amount of 36 to 39 wt.-%.

Preferably component (B) is at least one, preferably one, coupled conjugated diene/monovinylarene block copolymer (B) comprising at least three consecutive conjugated diene/monovinylarene tapered polymer blocks.

As used herein, consecutive means three sequential tapered polymer blocks with no intervening homopolymer blocks. As mentioned above the tapered polymer blocks contain a mixture of monovinylarene and conjugated diene.

The basic starting materials and polymerization conditions for preparing conjugated diene/monovinylarene block copolymer are disclosed in U.S. Pat. Nos. 4,091,053; 4,584, 346; 4,704,434; 4,704,435; 5,227,419 and 6,096,828; the disclosures of which are hereby incorporated by reference.

Suitable conjugated dienes which can be used in the block copolymers include those having 4 to 12 carbon atoms per molecule, with those having 4 to 8 carbon atoms preferred. Examples of such suitable compounds include 1,3-butadiene, 2-methyl-1,3-butadiene, 2-ethyl-1,3-butadiene, 2,3-dimethyl-1,3-butadiene, 1,3-pentadiene, 3-butyl-1,3-octadiene, and mixtures thereof. The preferred dienes are 1,3-butadiene and isoprene, more preferably 1,3-butadiene.

Suitable monovinylarene compounds which can be used in the block copolymers include those having 8 to 18 carbon atoms per molecule, preferably 8 to 12 carbon atoms. Examples of such suitable compounds include styrene, alpha-methylstyrene, 2-methylstyrene, 3-methylstyrene, 4-methylstyrene, 2-ethylstyrene, 3-ethylstyrene, 4-ethylstyrene, 4-n-propylstyrene, 4-t-butylstyrene, 2,4-dimethylstyrene, 4-cyclohexylstyrene, 4-decylstyrene, 2-ethyl-4-benzylstyrene, 4-(4-phenyl-n-butyl)-styrene, 1-vinylnaphthalene, 2-vinylnaphthalene, and mixtures thereof. Styrene is the preferred monovinylarene compound.

The monovinylarene monomer is present in the final block copolymer in an amount of from 61 to 64 weight percent based on the total weight of the final block copolymer.

The conjugated diene monomer is present in the final block copolymer in an amount of from 36 to 39 weight percent based on the total weight of the final block copolymer.

Preferably the block polymer contains at least three consecutive conjugated diene/monovinylarene tapered polymer blocks, which are incorporated sequentially into the block copolymer with no intervening homopolymer blocks.

The amount of each monomer in the tapered polymer block can vary broadly depending on the particular characteristics desired. Generally monovinylarene will be present in each tapered polymer block in an amount of from 2 to 18 weight percent based on the total weight of the final block copolymer, preferably from 3 to 16 weight percent.

Generally the conjugated diene will be present in each tapered polymer block in an amount of from 8 to 17 weight percent based on the total weight of the final block copolymer, preferably from 9 to 16 weight percent.

All conjugated diene monomer present in the final block copolymer is incorporated into the tapered polymer blocks.

The relative amount of each monomer in the tapered polymer block can also vary broadly depending on the particular characteristics desired. Preferably the conjugated diene will be present in each tapered polymer block in an amount of from 0.6 parts to 4 parts per part monovinylarene in the tapered polymer block, more preferably from about 0.7 parts to about 3.5 parts per part monovinylarene.

The monomer and monomer mixtures are copolymerized sequentially in the presence of an initiator. The initiators can be any of the organomonoalkali metal compounds known for such purposes. Preferably employed are compounds of the formula RM, wherein R is an alkyl, cycloalkyl, or aryl radical containing 4 to 8 carbon atoms, more preferably R is an alkyl moiety. M is an alkali metal, preferably lithium. The presently preferred initiator is n-butyl lithium.

The amount of initiator employed depends upon the desired polymer or incremental block molecular weight, as is known in the art, and is readily determinable, making due allowance for traces of poisons in the feed streams. Generally the initiator will be present in an amount in the range of from about 0.01 phm (parts by weight per hundred parts by weight of total monomer) to about 1.0 phm, preferably about 0.01 phm to about 0.5 phm, and more preferably from 0.01 phm to 0.2 phm.

Small amounts of polar organic compounds, such as ethers, thioethers, and tertiary amines can be employed in the hydrocarbon diluent to improve the effectiveness of the initiator and to randomize at least part of the monovinylarene monomer in a mixed monomer charge. Tetrahydrofuran is currently preferred. When employed, the polar organic compound is present in an amount sufficient to improve the effectiveness of the initiator. For example, when employing tetrahydrofuran to improve the effectiveness of the initiator, the tetrahydrofuran is generally present in an amount in the range of from about 0.01 to about 1.0 phm, preferably from about 0.02 to about 1.0 phm.5

The polymerization process is carried out in a hydrocarbon diluent at any suitable temperature in the range of from −100° C. to 150° C., preferably from 0° C. to 150° C., at pressures sufficient to maintain the reaction mixture substantially in the liquid phase. Preferred hydrocarbon diluents include linear or cycloparaffins or mixtures thereof. Typical examples include pentane, hexane, octane, cyclopentane, cyclohexane, and mixtures thereof. Cyclohexane is presently preferred. The polymerization is carried out in a substantial absence of oxygen and water, preferably under an inert gas atmosphere.

Each monomer charge or monomer mixture charge is polymerized under solution polymerization conditions such that the polymerization of each monomer charge or monomer mixture charge is substantially complete before charging a subsequent charge.

Typical initiator, monomer and monomer mixture charge sequences include, but are not limited to the following:

Mode A
(a) monovinylarene monomer and initiator,
(b) monovinylarene monomer and initiator,
(c) conjugated diene/monovinylarene monomer mixture, and
(d) coupling agent;

Mode B
(a) monovinylarene monomer and initiator,
(b) monovinylarene monomer and initiator,
(c) conjugated diene/monovinylarene monomer mixture,
(d) conjugated diene/monovinylarene monomer mixture, and
(e) coupling agent;

Mode C
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture, and
(f) coupling agent;

Mode D
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent;

Mode E
(a) monovinylarene monomer and initiator,
(b) monovinylarene monomer and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture,
(g) conjugated diene/monovinylarene monomer mixture, and
(h) coupling agent.

Mode F
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture, and
(e) coupling agent;

Mode G
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture, and
(f) coupling agent;

Mode H
(a) monovinylarene monomer and initiator,
(b) conjugated diene/monovinylarene monomer mixture and initiator,
(c) conjugated diene/monovinylarene monomer mixture,
(d) conjugated diene/monovinylarene monomer mixture,
(e) conjugated diene/monovinylarene monomer mixture,
(f) conjugated diene/monovinylarene monomer mixture, and
(g) coupling agent.

The monomer mixture can be premixed and charged as a mixture or the monomers can be charged simultaneously. In step (a) the initiator can be added before or after the monovinylarene monomer charge. In large scale operations it may be desirable to add the monovinylarene monomer before adding the initiator in step (a). In subsequent steps containing initiator, the initiator should be added prior to the monomer or monomer mixture.

Prior to coupling, typical polymer chains prepared by the above described sequential polymerizations include the following:
Mode A
S1-S2-B1/S3-Li
S2-B1/S3-Li
Mode B
1-S2-B1/S3-B2/S4-Li
S2-B1/S3-B2/S4-Li
Mode C
S1-S2-B1/S3-B2/S4-B3/S5-Li
S2-B1/S3-B2/S4-B3/S5-Li
Mode D
S1-S2-B1/S3-B2/S4-B3/S5-B4/S6-Li
S2-B1/S3-B2/S4-B3/S5-B4/S6-Li
Mode E
S1-S2-B1/S3-B2/S4-B3/S5-B4/S6-B5/S7-Li
S2-B1/S3-B2/S4-B3/S5-B4/S6-B5/S7-Li
Mode F
S1-B1/S2-B2/S3-B3/S4-Li
B1/S2-B2/S3-B3/S4-Li
Mode G
S1-B1/S2-B2/S3-B3/S4-B4/S5-Li
B1/S2-B2/S3-B3/S4-B4/S5-Li
Mode H
S1-B1/S2-B2/S3-B3/S4-B4/S5-B5/S6-Li
B1/S2-B2/S3-B3/S4-B4/S5-B5/S6-Li
where S1 and S2 are monovinylarene blocks, blocks B1/S2, B2/S3 etc. are tapered blocks containing a mixture of monovinylarene and conjugated diene, and Li is a residue from a monoalkali metal initiator.
Preferably Polymer Chains
(X) S1-S2-B1/S3-B2/S4-B3/S5-Li
(Y) S2-B1/S3-B2/S4-B3/S5-Li
according to Mode C are prepared.

In particular preferred block copolymers (B) comprise (or consist of) at least one polymer chain (X') of the formula S1-S2-B1/S3-B2/S4-B3/S5~, wherein S1, S2, B1/S3, B2/S4, B3/S5 are as hereinbefore defined and ~ is the bond to the coupling agent.

In formulas (X) and (Y), the total weight of blocks $S^1$ and $S^2$ can be from 30 wt. % to 70 wt. % (or preferably from 35 wt. % to 65 wt. %) of X, and $S^2$ can be from 15 wt. % to 45 wt. % (or preferably from 17 wt. % to 40 wt. %) of Y.

The number average molecular weight Mn of the polymer chain (X) or (X')—before coupling—is preferably 65.000 to 100.000 g/mol.

The number average molecular weight Mn of block S1 of the polymer chain (X) is preferably 20.000 to 40.000 g/mol.

The number average molecular weight Mn of block S2 of the polymer chain (X) is preferably 10.000 to 20.000 g/mol.

The number average molar weight $M_n$ is determined by GPC (solvent: tetrahydrofuran, polystyrene as polymer standard) with UV detection according to DIN 55672-1:2016-03.

The coupling agent is added after polymerization is complete. Suitable coupling agents include the di- or multivinylarene compounds, di- or multiepoxides, di- or multiisocyanates, di- or multiimines, di- or multialdehydes, di- or multiketones, alkoxytin compounds, di- or multihalides, particularly silicon halides and halosilanes, mono-, di-, or multianhydrides, di-, or multiesters, preferably the esters of monoalcohols with polycarboxylic acids, diesters which are esters of monohydric alcohols with dicarboxylic acids, diesters which are esters of monobasic acids with polyalcohols such as glycerol, and the like, and mixtures of two or more such compounds.

Useful multifunctional coupling agents include epoxidized vegetable oils such as epoxidized soybean oil, epoxidized linseed oil and the like or mixtures thereof. The presently preferred coupling agent is epoxidized vegetable oil. Presently preferred is epoxidized soybean oil.

Any effective amount of the coupling agent can be employed. While the amount is not believed to be critical, generally a stoichiometric amount relative to the active polymer alkali metal tends to promote maximum coupling. However, more or less than stoichiometric amounts can be used for varying coupling efficiency where desired for particular products. Typically the total amount of coupling agent employed in the polymerization is in the range of from about 0.1 phm to about 20 phm, preferably from about 0.1 phm to about 5 phm, and more preferably 0.1 phm to 2 phm.

Following completion of the coupling reaction, the polymerization reaction mixture can be treated with a terminating agent such as water, alcohol, phenols or linear saturated aliphatic mono-dicarboxylic acids to remove alkali metal from the block copolymer and for color control. The preferred terminating agent is water and carbon dioxide.

The polymer cement (polymer in polymerization solvent) usually contains about 10 to 40 weight percent solids, more usually 20 to 35 weight percent solids. The polymer cement can be flashed to evaporate a portion of the solvent so as to increase the solids content to a concentration of about 50 to about 99 weight percent solids, followed by vacuum oven or devolatilizing extruder drying to remove the remaining solvent.

Suitable block copolymers (B) are commercially available as K-resins KR20 and KRDEV034A.
Component (C)

Various additives and/or processing aids (C) (=component (C)) may be added to the molding compounds according to the invention in amounts of from 0.01 to 5 wt.-% as assistants and processing additives. Suitable additives and/or processing aids (C) include all substances customarily employed for processing or finishing the polymers, as long as the amounts and types do not interfere with the objectives of this invention.

Examples include, for example, dyes, colorants, antistats, antioxidants, stabilizers for improving thermal stability, stabilizers for increasing photostability, stabilizers for enhancing hydrolysis resistance and chemical resistance, anti-thermal decomposition agents, dispersing agents, anti-scratch and in particular external/internal lubricants (releasing agents) that are useful for production of molded bodies/articles.

These additives and/or processing aids may be admixed at any stage of the manufacturing operation, but preferably at an early stage in order to profit early on from the stabilizing effects (or other specific effects) of the added substance.

Preferably component (C) is at least one lubricant, antioxidant and/or colorant.

Suitable lubricants/glidants and demolding/releasing agents include stearic acids, stearyl alcohol, stearic esters, amide waxes (bisstearylamide, in particular ethylenebisstearamide), silicones, polyolefin waxes and/or generally higher fatty acids, derivatives thereof and corresponding fatty acid mixtures comprising 12 to 30 carbon atoms.

Examples of suitable antioxidants include sterically hindered monocyclic or polycyclic phenolic antioxidants which may comprise various substitutions and may also be bridged by substituents. These include not only monomeric but also oligomeric compounds, which may be constructed of a plurality of phenolic units. Hydroquinones and hydroquinone analogs are also suitable, as are substituted compounds, and also antioxidants based on tocopherols and derivatives thereof.

It is also possible to use mixtures of different antioxidants. It is possible in principle to use any compounds which are customary in the trade or suitable for styrene copolymers, for example antioxidants from the Irganox range. In addition to the phenolic antioxidants cited above by way of example, it is also possible to use socalled costabilizers, in particular phosphorus- or sulfur-containing costabilizers. These phosphorus- or sulfur-containing costabilizers are known to those skilled in the art.

For further additives and/or processing aids, see, for example, "Plastics Additives Handbook", Hans Zweifel, 6th edition, Hanser Publ., Munich, 2009.

Preparation of Thermoplastic Molding Composition

The thermoplastic molding composition of the invention may be produced from the components (A), (B) and, if present (C), and optionally further polymers (TP) by any known method. However, it is preferable when the components are premixed and blended by melt mixing, for example conjoint extrusion, preferably with a twin-screw extruder, kneading or rolling of the components. The melt mixing is generally done at temperatures in the range of from 180° C. to 250° C., preferably from 190° C. to 220° C.

The thermoplastic molding compositions according to the invention have high melt flow rates (MFI)—generally in the range of 100 to 140 g/10 min (ISO 1133, 220° C./10 kg load)—and can be processed easily and are suitable for the preparation of bulky and/or thin walled articles. They have further good mechanical, thermal and optical properties. A further subject of the invention is the use of the inventive thermoplastic molding composition for the production of shaped articles, in particular bulky and/or thin walled articles.

Processing may be carried out using the known processes for thermoplast processing, in particular production may be effected by thermoforming, extruding, injection molding, calendaring, blow molding, compression molding, press sintering, deep drawing or sintering; injection molding is preferred.

Preferred is the use of the thermoplastic molding composition according to the invention for applications in the household sector for articles with appreciable transparency, in particular bulky and/or thin walled articles, such as such as washing machine lids, water filter casings and large transparent casings of intricate design. Furthermore, the thermoplastic molding compositions according to the invention are used for manufacturing pens.

The invention is further illustrated by the examples and the claims.

EXAMPLES

Test Methods
Molar Mass $M_w$

The weight average molar mass $M_w$ is determined by GPC (solvent: tetrahydrofuran, polystyrene as polymer standard) with UV detection according to DIN 55672-1:2016-03.

Melt Flow Index (MFI) or Melt Volume Flow Rate (MFR)

MFI/MFR tests of the blends were performed according to ISO 1133 standard at 220° C./10 kg load and at 200° C./5 kg load by use of a MFI-machine of CEAST, Italy.

Izod Impact Test

Izod impact tests were performed on notched specimens of the blends (ISO 180) using an instrument of CEAST, Italy.

Tensile Strength (TS) and Tensile Modulus (TM) Test

Tensile tests (ISO 527) of the blends were carried out at 23° C. using an Universal testing Machine (UTM) of Instron, UK.

Flexural Strength (FS) and Flexural Modulus (FM) Test

Flexural test of the blends (ISO 178) was carried out at 23° C. using a UTM of Lloyd Instruments, UK.

VICAT Softening Temperature (VST)

Vicat softening temperature test was performed on injection molded test specimen (ISO 306) using a Zwick Roell GmbH machine. The test was carried out at a heating rate of 120° C./hr at 50 N loads (Method B) and and carried out at a heating rate of 50° C./hr at 10 N loads (Method A).

Transparency

The transparency (%) is checked by ASTM D 1003 using Datacolor 850 US machine.

Haze

The % haze (%) is checked by ASTM D 1003 using Datacolor 850 US machine.

Materials Used:
Component A

Statistical copolymer (A-I) from styrene and acrylonitrile with a ratio of polymerized styrene to acrylonitrile of 73:27 with a weight average molecular weight Mw of 100,000 g/mol and a melt volume flow rate (MVR) (220° C./10 kg load) of 75 g/10 minutes, produced by free radical solution polymerization.

Component B

B-1: K-resin® KR20, a styrene butadiene block copolymer (styrene content 62 wt.-%) from Ineos Styrolution, Germany.

B-2: K-resin® KRDEV034A, a styrene butadiene block copolymer (styrene content 62 wt.-%) from Ineos Styrolution, Germany.

Thermoplastic Molding Compositions

SAN-copolymer (A-I), SBC-block copolymer (B-1) or (B-2), and the afore-mentioned components (C) were mixed (composition see Tables 1 and 2, batch size 5 kg) for 2 minutes in a high speed mixer to obtain good dispersion and a uniform premix and then said premix was melt blended in a twin-screw extruder at a speed of 80 rpm and using an incremental temperature profile from 190 to 220° C. for the different barrel zones. The extruded strands were cooled in a water bath, air-dried and pelletized.

Standard test specimens of the obtained blend were injection molded at a temperature of 190 to 230° C. and test specimens were prepared for mechanical testing. The test results (properties) are presented in Tables 3 and 4.

TABLE 1

Composition (in wt.-%) of Tested Blends

| Component | Composition | | | | | | |
|---|---|---|---|---|---|---|---|
| | 1* | 2* | 3* | 4 | 5 | 6 | 7* |
| B-2 | 100 | 80 | 70 | 60 | 40 | 20 | 0 |
| A-1 | 0 | 20 | 30 | 40 | 60 | 80 | 100 |

*non-inventive composition

TABLE 2

Composition of Tested Blends

| Component | Composition | | | | | | |
|---|---|---|---|---|---|---|---|
| | 8* | 9* | 10* | 11 | 12 | 13 | 14 |
| B-1 | 100 | 80 | 70 | 60 | 40 | 30 | 20 |
| A-1 | 0 | 20 | 30 | 40 | 60 | 70 | 80 |

*non-inventive composition

TABLE 3

Properties of Tested Blends

| Trials as per ISO standard | Composition | | | | | | |
|---|---|---|---|---|---|---|---|
| | 1* | 2* | 3* | 4 | 5 | 6 | 7* |
| MFI [gm/10 min] [200° C./10 kg] | 49 | 76 | 93 | 106 | 113 | 121 | 75 |
| MFI [gm/10 min] [200° C./5 kg] | 6 | 9.2 | 10.7 | 11.6 | 11 | 9.2 | 6.2 |
| Izod [KJ/mm$^2$] | (NB) | 70 | 27.4 | 5.9 | 3.0 | 1.8 | 2.0 |
| TS [MPa] | 4.5 | 14.0 | 20.3 | 30.9 | 43.8 | 47.95 | 61.3 |
| TM (E-Modul) [MPa] | 187 | 664 | 930 | 1412 | 2565 | 3210 | 3159 |
| FS [MPa] | 5.8 | 19.3 | 26.3 | 37.2 | 67.7 | 94.3 | 68.5 |
| FM [MPa] | 208.9 | 663.0 | 986.0 | 1423 | 2313 | 3136 | 3906 |
| VST B50 | — | 53.0 | 54.1 | 59.3 | 74.0 | 93.4 | 100 |
| VST A50 | 54.7 | 70.1 | 79.0 | 88.4 | 100 | 105.5 | 106 |
| Transparency [%] 700-750 nm | 84 | 88.4 | 89.3 | 88.3 | 88.68 | 88.93 | 89.93 |
| Haze [%] | 39 | 19.8 | 16.3 | 15.2 | 10.3 | 9.1 | 2.6 |

TABLE 4

| Trials as per ISO std | Composition | | | | | | | |
|---|---|---|---|---|---|---|---|---|
| | 8* | 9* | 10* | 11 | 12 | 13 | 14 | 7* |
| MFI [gm/10 min] [200° C./10 kg] | 76 | 114 | 132 | 140 | 125 | 119 | 116 | 75 |
| MFI [gm/10 min] [200° C./5 kg] | 9.2 | 8.9 | 10.2 | 11.4 | 14.2 | 12.6 | 11.0 | 6.2 |
| Izod [KJ/mm$^2$] | (NB) | 70.0 | 5.2 | 4.0 | 1.5 | 1.7 | 2.0 | 2.0 |
| TS [MPa] | 8.5 | 17.2 | 25.5 | 34.2 | 45.5 | 51.2 | 54.7 | 61.3 |
| TM (E-Modul) [MPa] | 628 | 1157 | 1467 | 1702 | 2619 | 3072 | 3250 | 3159 |
| FS [MPa] | 21.5 | 28.3 | 36.2 | 44.5 | 69.4 | 87.4 | 96.3 | 68.5 |
| FM [MPa] | 597 | 1167 | 1422 | 1740 | 2449 | 2883 | 3246 | 3906 |
| VST B50 | 44 | 50.1 | 58.8 | 65.4 | 79.5 | 85.6 | 93 | 100 |
| VST A50 | 66.7 | 70.1 | 85.8 | 93.8 | 103.6 | 104.9 | 105.5 | 106 |
| Transparency [%] 700-750 nm | 87 | 90.80 | 90.17 | 89.58 | 89.81 | 88.77 | 89.87 | 89.93 |
| Haze [%] | 20 | 16.1 | 15.1 | 12.4 | 9.3 | 9.9 | 9.9 | 2.6 |

The test results show that the inventive compositions (cp. 4, 5, 6, 11, 12, 13 and 14) have a high melt flow index in combination with good mechanical, thermal and optical properties.

The invention claimed is:

1. A thermoplastic molding composition comprising components A, B, and C:

(A) 40 to 80 wt.-% of at least one copolymer (A) of styrene and acrylonitrile in a weight ratio of from 78:22 to 65:35, wherein the styrene and/or acrylonitrile is optionally partially replaced by methyl methacrylate, maleic anhydride, N-phenylmaleimide, and/or 4-phenylstyrene; wherein copolymer (A) has a weight average molar mass $M_w$ of 80,000 to 150,000 g/mol;

(B) 20 to 60 wt.-% of at least one coupled conjugated diene/monovinylarene block copolymer (B) comprising at least three consecutive conjugated diene/monovinylarene tapered polymer blocks, wherein in the final block copolymer all conjugated diene is incorporated into the tapered polymer block, and, based on the total weight of the final block copolymer, the monovinylarene is present in an amount of 61 to 64 wt.-%, and the conjugated diene is present in an amount of 36 to 39 wt.-%; and (C) 0 to 5 wt.-% additives and/or processing aids (C);

wherein the components A, B, and, if present, C, sum to 100 wt.-%.

2. The thermoplastic molding composition according to claim 1, comprising:

55 to 70 wt.-% component (A), 30 to 45 wt.-% component (B), and 0 to 5 wt.-% component (C).

3. The thermoplastic molding composition according to claim 1, wherein copolymer (A) is a copolymer of styrene and acrylonitrile in a weight ratio of from 75:25 to 70:30.

4. The thermoplastic molding composition according to claim 1, wherein $M_w$ of copolymer (A) is 90,000 to 150,000 g/mol.

5. The thermoplastic molding composition according to claim 1, wherein in block copolymer (B) the conjugated diene is 1,3-butadiene and the monovinylarene is styrene.

6. The thermoplastic molding composition according to claim 1, wherein in each individual tapered polymer block of block copolymer (B) the monovinylarene is present in an amount of from 2 to 18 wt.-%, based on the total weight of the final block copolymer, and the conjugated diene is present in an amount of from 8 to 17 wt.-%, based on the total weight of the final block copolymer.

7. The thermoplastic molding composition according to claim 1, where the block copolymer (B) comprises at least one polymer chain S1-S2-B1/S3-B2/S4-B3/S5~, wherein S1 and S2 are monovinylarene blocks, blocks B1/S3, B2/S4, B3/S5 are tapered blocks containing a mixture of monovinylarene and conjugated diene, and ~ is the bond to the coupling agent.

8. The thermoplastic molding composition according to claim 1, wherein in each tapered polymer block of block copolymer (B) the conjugated diene is present in an amount of from 0.6 parts to 4 parts per part monovinylarene in the tapered polymer block.

9. A process for the preparation of the thermoplastic molding composition according to claim 1 by melt mixing the components (A), (B), and, if present, (C), at temperatures in the range of from 180° C. to 250° C.

10. A method of using the thermoplastic molding composition according to claim 1 to produce a shaped article.

11. A shaped article made from the thermoplastic molding composition according to claim 1.

12. A washing machine lid made from the thermoplastic molding composition according to claim 1.

13. A pen made from the thermoplastic molding composition according to claim 1.

* * * * *